UNITED STATES PATENT OFFICE.

OSCAR T. ZINKEISEN, OF NEW YORK, N. Y., ASSIGNOR TO FORE CHEMICAL WORKS, INC., OF NEW YORK, N. Y., A CORPORATION OF DELAWARE.

PROCESS OF PURIFYING CRUDE ACETATE OF LIME.

1,213,724.  Specification of Letters Patent.  Patented Jan. 23, 1917.

No Drawing.  Application filed January 24, 1911. Serial No. 604,303.

*To all whom it may concern:*

Be it known that I, OSCAR T. ZINKEISEN, a citizen of the United States, residing in the city of New York, borough of Manhattan, county and State of New York, have invented a certain new and useful Process of Purifying Crude Acetate of Lime, of which the following is a specification.

Crude acetate of lime usually contains from 15 to 25% of impurities, of a tarry or similar nature, the presence of which is a decided disadvantage.

The object of the present invention is to remove the bulk of such impurities, and produce a comparatively pure acetate of lime, suitable for use in manufacturing acetic acid and for other commercial purposes.

The salient features of novelty in my process, though not exclusive, consist in making a solution of the crude acetate alkaline, by the addition of appropriate bases, or metals which form bases, and then effecting a precipitation of the impurities in the acetate by heating the alkaline solution with suitable metallic salts.

While the process may be modified within certain limits, both as to procedure and as to the chemical agents employed, I will now describe one way of practically and successfully carrying out the said process.

As is well known, crude acetate of lime contains a substantial quantity of volatile organic impurities which may be driven off in part by heating or calcining the product, and I preferably so treat the acetate before subjecting it to my process, and particularly if the acetate to be purified is in a dry form. If the acetate is in solution, as obtained in the ordinary process of manufacture, it is not necessary to dry it first, nor to heat it for calcination.

In any event, I operate on a solution of acetate, either using the original solution before evaporation as obtained in a wood by-products plant or a solution made by dissolving the dry acetate. The solution operated upon may contain a quantity of water, or other liquid present in the crude solution, equal in weight to from 1 to 6 times the weight of the impure acetate of lime figured on a dry basis.

The first step in the process is to make the solution slightly alkaline by adding thereto a suitable base, or metal as described, such as calcium oxid, or hydrate, magnesium oxid, or hydrate, caustic soda, or potash, or carbonates of potassium or sodium.

To the thus prepared alkaline solution of the acetate, I add the solution of a suitable precipitant or coagulant, and for the purpose I have found that sulfate of aluminum, ferrous sulfate, ferric sulfate, or alum, or a mixture of any two or more of these agents, is particularly well adapted. The quantity of the dry precipitant used will naturally depend upon the specific chemical character of the crude acetate operated upon, as well as, to some extent, upon the particular precipitant employed, but I have obtained satisfactory results by using as low as ¼% of the precipitant and as high as 5%; *i. e.*, from ¼ to 5%, by weight, of the dry acetate. For economical reasons I prefer to use lime, as the alkaline agent, and ferrous sulfate as the precipitant.

The precipitant having been added to the slightly alkaline solution of the acetate, the mixture is boiled, preferably at a temperature ranging from 100° to 125° C. Fairly satisfactory results may be obtained, however, by heating the mixture at a temperature as low as 80 to 90° C., and as high as 150° C.

The heating or boiling is continued for a period ranging from a few minutes to three and one half hours, dependent upon conditions of operation, when it will be found that substantially all the impurities will have separated as insoluble organic salts or products which may be readily freed from the solution in any well known manner, such as by the use of a filter press. After filtering, as described, the dry acetate may be obtained by evaporation, as is usually done. If preferred, the precipitant may be added to the solution of acetate prior to making the same alkaline.

The solution of acetate may be clarified by a suitable bleaching agent, such as chlorin, either before or after filtration. Moreover, if an alkaline bleaching agent is employed, such as sodium peroxid, calcium peroxid, or perborate of calcium, such agent may be added to the acetate solution prior to, or during, the precipitation process.

It will be manifest that the specific process outlined may be modified as to details, or in accordance with chemical skill, to meet particular conditions of operation, without departing from the spirit of the invention. Furthermore, the process in its entirety need not necessarily be employed, nor need the exact order of steps outlined be necessarily followed. The process outlined is applicable, also, to the purification of acetates other than acetate of lime.

Having thus fully described the invention, what I claim as new and desire to secure by Letters Patent is:—

1. The process of purifying a solution of acetate of lime, which consists in precipitating the organic impurities from an alkaline solution of said acetate and in the presence of an alkaline bleaching agent.

2. The process of purifying a solution of acetate of lime, which consists in boiling the same with lime, a salt of iron and a bleaching agent.

In testimony whereof I have signed my name to this specification in the presence of two subscribing witnesses.

OSCAR T. ZINKEISEN.

Witnesses:
M. E. FREEMAN,
ROBERT N. RIDDLE.